US010892677B2

(12) United States Patent
Kataoka et al.

(10) Patent No.: US 10,892,677 B2
(45) Date of Patent: Jan. 12, 2021

(54) POWER SUPPLY CIRCUIT AND AUDIO SYSTEM

(71) Applicant: YAMAHA CORPORATION, Hamamatsu (JP)

(72) Inventors: Takuya Kataoka, Hamamatsu (JP); Hitoshi Shima, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/537,735

(22) Filed: Aug. 12, 2019

(65) Prior Publication Data

US 2019/0363629 A1  Nov. 28, 2019

Related U.S. Application Data

(63) Continuation of application No. PCT/JP2017/011201, filed on Mar. 21, 2017.

(51) Int. Cl.
*H02M 1/32* (2007.01)
*H02M 1/08* (2006.01)
*H02M 7/217* (2006.01)
*H04R 3/00* (2006.01)

(52) U.S. Cl.
CPC .............. *H02M 1/32* (2013.01); *H02M 1/08* (2013.01); *H02M 7/217* (2013.01); *H04R 3/00* (2013.01)

(58) Field of Classification Search
CPC .......... H02M 1/32; H02M 7/217; H02M 1/08; H04R 3/00
See application file for complete search history.

(56) References Cited

FOREIGN PATENT DOCUMENTS

| JP | 62135274 | * | 6/1987 |
| JP | S62135274 A | | 6/1987 |
| JP | S6359728 A | | 3/1988 |
| JP | H10201235 A | | 7/1998 |
| JP | 2009159433 A | | 7/2009 |

OTHER PUBLICATIONS

International Search Report issued in Intl. Appln. No. PCT/JP2017/011201 dated Jun. 6, 2017. English translation provided.
Written Opinion issued in Intl. Appln. No. PCT/JP2017/011201 dated Jun. 6, 2017.
Office Action issued in Japanese Appln. No. 2019-506579 dated Sep. 23, 2020. English machine translation provided.

* cited by examiner

*Primary Examiner* — Regina N Holder
(74) *Attorney, Agent, or Firm* — Rossi, Kimms & McDowell LLP

(57) ABSTRACT

A power supply circuit is a power supply circuit that generates a direct current (DC) voltage from an alternating current (AC) voltage, and includes a rectifying circuit that rectifies the AC voltage, a capacitor that smooths the rectified voltage, a first switching element disposed on a path for charging the capacitor, a comparison circuit that compares an index voltage depending on the smoothed voltage with a reference voltage, and a driving circuit that sets the first switching element to an ON state, in a state in which the index voltage is lower than the reference voltage, and sets the first switching element to an OFF state, in a state in which the index voltage exceeds the reference voltage.

5 Claims, 3 Drawing Sheets

POWER SUPPLY CIRCUIT AND AUDIO SYSTEM

This Application is a Continuation Application of PCT Application No. PCT/JP2017/011201, filed Mar. 21, 2017, the entire contents of which are incorporated herein by reference.

BACKGROUND OF THE INVENTION

Field of the Invention

The present invention relates to a power supply circuit that generates a direct current (DC) voltage from an alternating current (AC) voltage, and relates to an audio system.

Description of Related Art

There have been proposed technologies for executing various types of signal processing for audio signals in related art. For example, Japanese Patent Application, Laid-Open Publication No. 2009-159433 discloses an amplifier that amplifies an audio signal while preventing clipping. The amplification device operates using, for example, a DC voltage that a power supply circuit generates from an AC voltage of a commercial power supply.

For example, when a power supply circuit is mistakenly connected to a high voltage power supply or when a power supply voltage fluctuates unstably in an area in which power supply is of poor quality, an abnormal AC voltage exceeding a rated voltage (hereinafter referred to as an "abnormal voltage") may be supplied to the power supply circuit. When an abnormal voltage is supplied to the power supply circuit, a capacitor for smoothing an AC voltage may be damaged.

SUMMARY

In consideration of the foregoing circumstances, an object of a preferred aspect of the present invention is to reduce the probability of a smoothing capacitor mounted in a power supply circuit being damaged.

In order to solve the foregoing problem, a power supply circuit according to a preferred aspect of the present invention is a power supply circuit configured to generate a DC voltage from an AC voltage, the power supply circuit including: a rectifying circuit configured to rectify the AC voltage; a capacitor configured to smooth the rectified voltage; a first switching element disposed on a path for charging the capacitor; a comparison circuit configured to compare an index voltage depending on the smoothed voltage with a reference voltage; and a driving circuit configured to set the first switching element to an ON state, in a state in which the index voltage is lower than the reference voltage, and to set the first switching element to an OFF state, in a state in which the index voltage exceeds the reference voltage.

An audio system according to another aspect of the present invention is an audio system including an audio processing device configured to process an audio signal, and a power supply circuit configured to generate a DC voltage from an AC voltage and supplies the DC voltage to the audio processing device, in which the power supply circuit includes a rectifying circuit configured to rectify the AC voltage; a capacitor configured to smooth the rectified voltage; a first switching element disposed on a path for charging the capacitor; a comparison circuit configured to compare an index voltage depending on the smoothed voltage with a reference voltage; and a driving circuit configured to set the first switching element to an ON state, in a state in which the index voltage is lower than the reference voltage, and to set the first switching element to an OFF state, in a state in which the index voltage exceeds the reference voltage.

DESCRIPTION OF THE EMBODIMENTS

Figure 1:
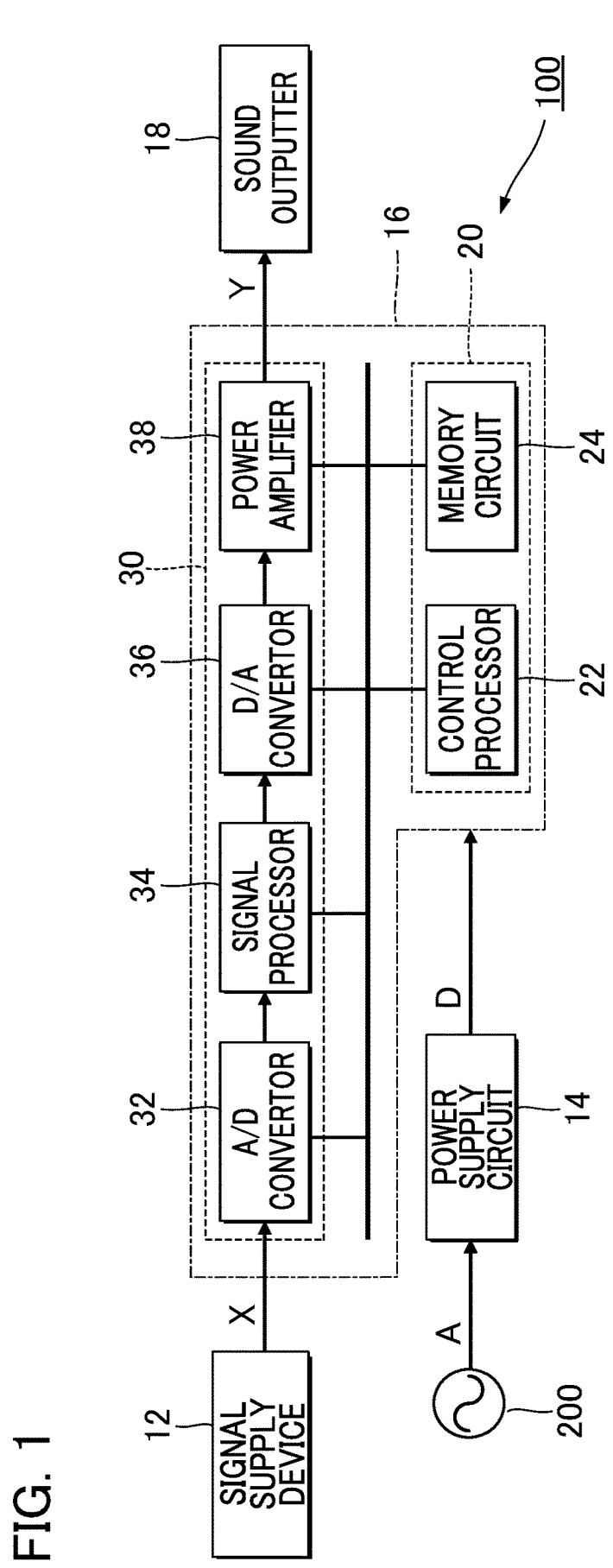
FIG. 1 is a configuration diagram of an audio system according to a preferred aspect of the present invention.

FIG. 1 is a block diagram of an audio system 100 according to a preferred embodiment of the present invention. As shown in FIG. 1, the audio system 100 is a computer system that plays various sounds such as musical sounds or speech sounds, and includes a signal supply device 12, a power supply circuit 14, an audio processing device 16, and a sound outputter 18. Any two or more elements of the audio system 100 may be integrally configured. For example, the power supply circuit 14 may be mounted on the audio processing device 16.

The signal supply device 12 is a signal source that supplies an audio signal X representative of various sounds such as speech sounds or musical sounds to the audio processing device 16. Examples suitable for the signal supply device 12 include a reproduction device that reads out the audio signal X from a portable or built-in recording medium. Examples of the signal supply device 12 also include a sound receiver that receives surrounding sound to generate the audio signal X, or a communication device that receives the audio signal X from another device via a communication network.

The power supply circuit 14 converts, for example, an AC voltage A supplied from an AC power supply 200 such as a commercial power supply into a DC voltage D. The audio processing device 16 operates using a DC voltage D that is supplied from the power supply circuit 14 as a supply voltage. The audio processing device 16 generates an audio signal Y by processing the audio signal X that is supplied from the signal supply device 12. The sound outputter 18 is, for example, a speaker or a headphone. The sound outputter 18 plays the sound represented by the audio signal Y generated by the audio processing device 16.

As shown in FIG. 1, the audio processing device 16 includes a control unit 20 and a signal processing circuit 30. The control unit 20 includes a control processor 22 and a storage circuit 24. The control processor 22 is, for example, an arithmetic processing circuit such as a central processing unit (CPU). The control processor 22 controls the signal processing circuit 30 by executing a program stored in the storage circuit 24. The storage circuit 24 stores a program to be executed by the control processor 22 and various types of data to be used by the control processor 22. For example, there may be used, as the storage circuit 24, a known recording medium such as a semiconductor recording medium or a magnetic recording medium, or a combination of recording mediums of a plurality of types.

The signal processing circuit 30 generates the audio signal Y by executing signal processing on the audio signal X under the control of the control unit 20. As shown in FIG. 1, the signal processing circuit 30 includes an A/D convertor 32, a signal processor 34, a D/A convertor 36, and a power amplifier 38. The A/D convertor 32 converts the audio signal X supplied from the signal supply device 12 from an analog signal to a digital signal. The signal processor 34 is a digital signal processor (DSP) that executes various types of signal processing on the audio signal X converted by the A/D convertor 32. Examples of signal processing in the signal processor 34 include crossover processing for dividing the bandwidth of the audio signal X into a plurality of bands, delay processing for delaying the audio signal X, equalizer processing for adjusting frequency characteristics of the audio signal X, limiter processing for limiting a voltage range of the audio signal X, or howling suppression processing for suppressing howling.

The D/A convertor 36 converts the digital signal processed by the signal processor 34 into the analog audio signal Y. The power amplifier 38 amplifies the audio signal Y converted by the D/A convertor 36. For example, there may be used, as the power amplifier 38, various amplification circuits such as a class AB amplifier or a class D amplifier. The audio signal Y after power amplification in the power amplifier 38 is supplied to the sound outputter 18.

Figure 2:
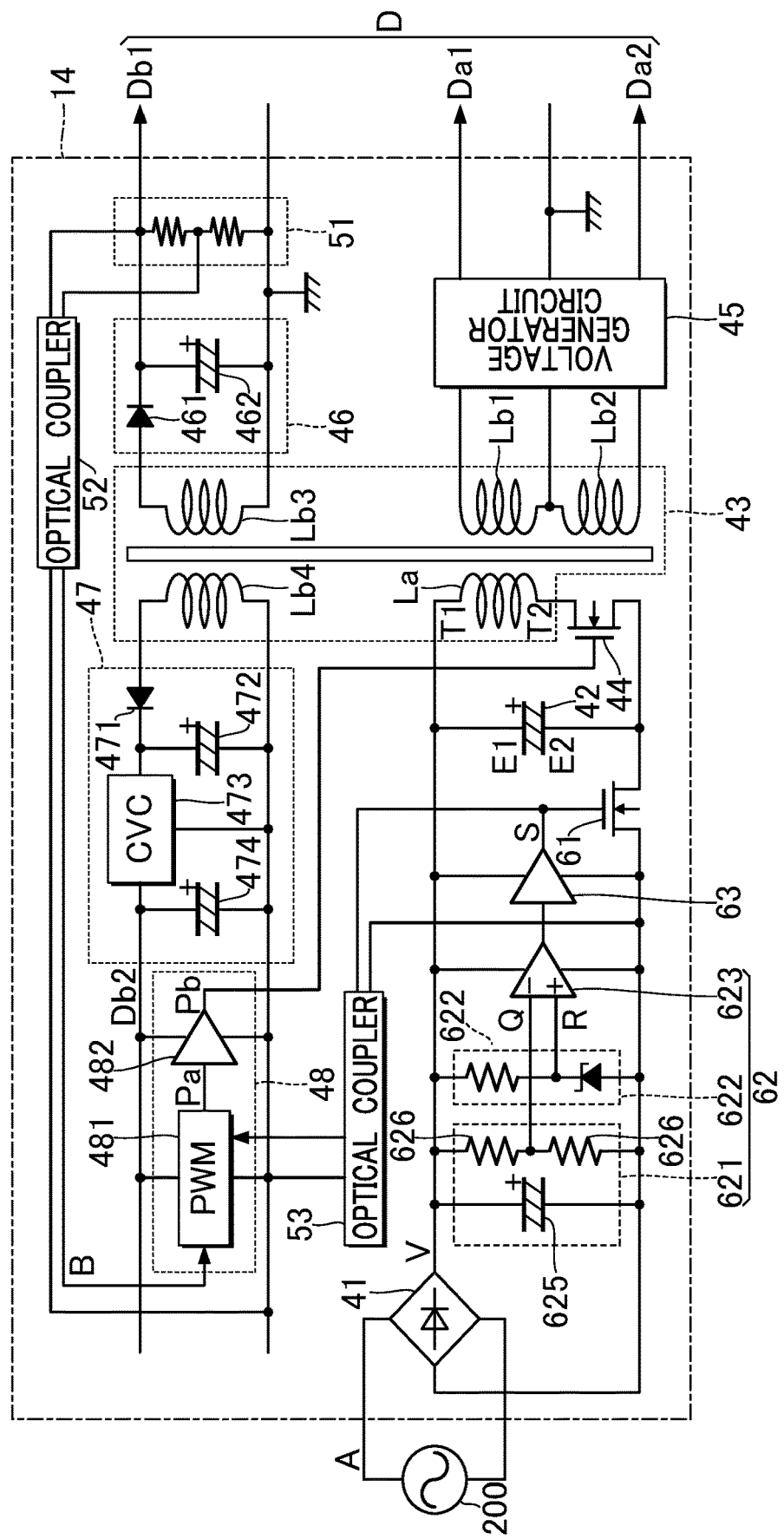
FIG. 2 is a configuration diagram of a power supply circuit.

FIG. 2 is a circuit diagram of the power supply circuit 14. As shown in FIG. 2, the power supply circuit 14 according to the embodiment includes a rectifying circuit 41, a capacitor 42, a transformer 43, a switching element 44, a voltage generation circuit 45, a voltage generation circuit 46, and a voltage generation circuit 47, and a switching control circuit 48.

The rectifying circuit 41 rectifies the AC voltage A supplied from the AC power supply 200. For example, there may be used, as the rectifying circuit 41, a bridge-type full-wave rectifying circuit that full-wave rectifies the AC voltage A. The capacitor 42 is, for example, an electrolytic capacitor including a first electrode E1 and a second electrode E2. The capacitor 42 smooths the voltage rectified by the rectifying circuit 41. The first electrode E1 is connected to an output terminal of the rectifying circuit 41.

The transformer 43 includes a primary coil La and secondary coils Lb (Lb1, Lb2, Lb3, and Lb4). The primary coil La includes a first terminal T1 and a second terminal T2. The first terminal T1 of the primary coil La is connected to the output terminal of the rectifying circuit 41. Each of the secondary coils Lb is magnetically coupled to the primary coil La. Therefore, when a voltage of the primary coil La fluctuates, a voltage is generated in each secondary coil Lb due to electromagnetic induction. The ratio of the number of turns of each of the secondary coils Lb to the number of turns of the primary coil La is set to a predetermined ratio.

The switching element 44 (an example of a second switching element) is disposed on a path for supplying a current to the primary coil La. The switching element 44 is switched, whereby application of the smoothed voltage V to the primary coil La of the transformer 43 or non-application is switched therebetween. Specifically, the switching element 44 is disposed on a path between the second terminal T2 of the primary coil La and the rectifying circuit 41, and is set to either the ON state or the OFF state. Examples for the switching element 44 include an N-channel metal oxide semiconductor field effect transistor (MOSFET). The capacitor 42 is connected in parallel to the primary coil La and the switching element 44.

The voltage generation circuit 45 generates a DC voltage Da1 from the voltage generated in the secondary coil Lb1, and generates a DC voltage Da2 from the voltage generated in the secondary coil Lb2. The voltage generation circuit 45 includes, for example, a general rectification circuit (not shown) including a rectification diode, a general smoothing circuit (not shown) including a capacitor, and a voltage drop type constant voltage circuit (for example, a three-terminal regulator, not shown) connected in series to a load. The DC voltage Da1 is a voltage with positive polarity relative to a ground potential. The DC voltage Da2 is a voltage with a negative polarity relative to the ground potential. The DC voltage Da1 and the DC voltage Da2 generated by the voltage generation circuit 45 are supplied to elements (for example, the A/D convertor 32, the D/A convertor 36, and the power amplifier 38) related to analog signals in the audio processing device 16.

The voltage generation circuit 46 generates a DC voltage Db1 from the voltage generated in the secondary coil Lb3 of the transformer 43. The DC voltage Db1 generated by the voltage generation circuit 46 is supplied to an element related to digital signals in the audio processing device 16. Examples of the element include the signal processor 34 and the control unit 20. As shown in FIG. 2, the voltage generation circuit 46 includes a rectifying diode 461 and a capacitor 462. The rectifying diode 461 half-wave rectifies the voltage of the secondary coil Lb3. The capacitor 462 is an electrolytic capacitor. The capacitor 462 generates a DC voltage Db1 by smoothing the voltage rectified by the rectifying diode 461.

The voltage generation circuit 47 generates a DC voltage Db2 from the voltage generated in the secondary coil Lb4 of the transformer 43. Specifically, the voltage generation circuit 47 includes a rectifying diode 471 that half-wave rectifies the voltage of the secondary coil Lb4, a capacitor 472 that smooths the rectified voltage, and a constant voltage circuit (referred to as "CVC" in FIG. 2) 473 and a capacitor 474 that maintain the voltage constant.

The switching control circuit 48 controls the switching element 44 using the DC voltage Db2 generated by the voltage generation circuit 47 as a supply voltage. Specifically, the switching control circuit 48 includes a pulse width modulation (PWM) circuit 481 (referred to as "PWM" in FIG. 2) and a driving circuit 482, as shown in FIG. 2. A voltage (hereafter, a "feedback voltage") B that a voltage divider 51 and an optical coupler 52 generate from the DC voltage Db1 is supplied to the PWM circuit 481. The feedback voltage B is a voltage proportional to the DC voltage Db1, and changes in a low range of voltage that can be sufficiently handled by a normal logic circuit.

The PWM circuit 481 generates a pulse signal Pa having a duty cycle corresponding to the feedback voltage B. Specifically, the PWM circuit 481 generates the pulse signal Pa so that a duty ratio decreases when the feedback voltage B is higher (the DC voltage Db1 is higher). Examples for the PWM circuit 481 include a power supply control IC (product number: FA5511) manufactured by Fuji Electric Co., Limited.

The driving circuit 482 controls the switching element 44 depending on the pulse signal Pa generated by the PWM circuit 481. Specifically, the driving circuit 482 is an amplification circuit that generates a control signal Pb by amplifying the pulse signal Pa generated by the PWM circuit 481 to a sufficient voltage to drive the switching element 44. The control signal Pb generated by the driving circuit 482 is supplied to a control terminal of the switching element 44. As will be understood from the foregoing explanation, the switching control circuit 48 according to the embodiment controls the switching of the switching element 44 with a duty ratio depending on the DC voltage Db1. That is, when the DC voltage Db1 is lower (a duty ratio of the pulse signal Pa is higher), a proportion of time at which a current is supplied to the primary coil La increases. As a result, each DC voltage D increases. Conversely, when the DC voltage Db1 is higher, the proportion of time rate at which the current is supplied to the primary coil La decreases. As a result, each DC voltage D decreases. That is, the switching control circuit 48 controls the duty ratio so that each DC voltage D is maintained substantially constant even when a load of the power supply circuit 14 (or a current supplied by the power supply circuit 14) fluctuates. As described above, the power supply circuit 14 according to the embodiment is a switching power supply (SMPS: Switched-Mode Power Supply) that generates each DC voltage D through switching (on/off) of the switching element 44. The switching element 44 functions as an element that converts the smoothed voltage V of the capacitor 42 into an AC voltage.

As shown in FIG. 2, the power supply circuit 14 according to the embodiment includes a switching element 61 (an example of a first switching element), a detection circuit 62, and a driving circuit 63, in addition to the elements described above. The detection circuit 62 and the driving circuit 63 operate using the smoothed voltage V as a supply voltage.

The switching element 61 includes, for example, an N-channel MOSFET, and is disposed on a path for charging the smoothing capacitor 42. Specifically, the switching element 61 according to the embodiment is disposed on a path between the second electrode E2 of the capacitor 42 and the rectifying circuit 41. That is, the switching element 44 and the switching element 61 are connected in series between the second terminal T2 of the primary coil La in the transformer 43 and the rectifying circuit 41.

The detection circuit 62 detects any abnormality in the smoothed voltage V or the AC voltage A. Specifically, the detection circuit 62 according to the embodiment detects when the index voltage Q depending on the smoothed voltage V has exceeded a predetermined voltage (hereafter, a "reference voltage") R. As shown in FIG. 2, the detection circuit 62 includes a voltage generator 621, a voltage generator 622, and a comparison circuit 623.

The voltage generator 621 includes, for example, a capacitor 625 and resistors 626. The voltage generator 621 generates the index voltage Q by dividing the smoothed voltage V. The capacitor 625 has a withstand voltage exceeding that of the capacitor 42 and a capacitance smaller than that of the capacitor 42. The capacitor 625 may have a capacitance sufficiently small to realize smoothing required for a supply voltage for the detection circuit 62 and the driving circuit 63. In contrast, the capacitor 42 needs to have a capacitance sufficiently large to guarantee a stable operation of the power supply circuit 14 at the time of a maximum rated load. The voltage generator 622 includes, for example, a Zener diode and a resistor to generate a reference voltage R. The reference voltage R is a voltage that is lower than the withstand voltage of the capacitor 42. In a state in which there is no abnormality in the AC voltage A (hereinafter referred to as "a normal state"), the index voltage Q is lower than the reference voltage R.

The comparison circuit 623 compares the index voltage Q generated by the voltage generator 621 with the reference voltage R generated by the voltage generator 622. Examples of the comparison circuit 623 include a comparator (product number: BU7231) manufactured by ROHM Co., Limited. Specifically, the comparison circuit 623 sets the output signal to a high level in the normal state in which the index voltage Q is lower than the reference voltage R. Conversely, the comparison circuit 623 sets the output signal to a low level in a state in which the index voltage Q exceeds the reference voltage R (hereinafter referred to as "an abnormal state"). Therefore, the low level of the output signal generated by the comparison circuit 623 indicates that an abnormality in the AC voltage A has been detected. That is, the comparison circuit 623 functions as a means for detecting that the index voltage Q has exceeded the reference voltage R.

Figure 3:
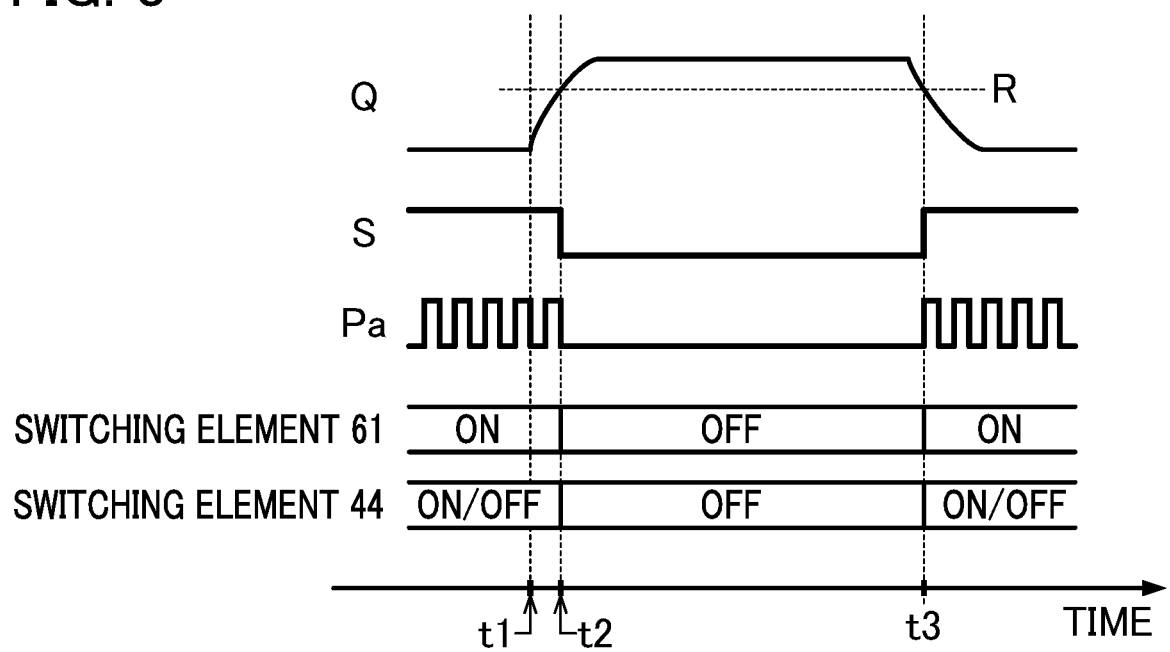
FIG. 3 is an illustrative diagram of an operation of the power supply circuit.

The driving circuit 63 controls the switching element 61 depending on a result obtained by the comparison circuit 623 comparing the index voltage Q with the reference voltage R. Specifically, the driving circuit 63 generates a control signal S depending on the output signal from comparison circuit 623. For example, the driving circuit 63 is an amplification circuit that generates the control signal S by amplifying the output signal of the comparison circuit 623 to a sufficient voltage to drive the switching element 61. As shown in FIG. 3, the control signal S is set to a high level in the normal state in which the index voltage Q is lower than the reference voltage R. Conversely, the control signal S is set to a low level in an abnormal state in which the index voltage Q exceeds the reference voltage R. The control signal S generated by the driving circuit 63 is supplied to the control terminal of the switching element 61.

As shown in FIG. 3, in the normal state in which the control signal S is set to the high level, the switching element 61 is maintained to be in the ON state. Therefore, as described above, the switching of the switching element 44 is controlled with the duty ratio, which depends on the DC voltage Db1. Accordingly, each DC voltage D is generated. Conversely, in the abnormal state, in which the control signal S is set to the low level, the switching element 61 is maintained to be in the OFF state. Therefore, charging of capacitor 42 is stopped. As will be understood from the foregoing description, the driving circuit 63 sets the switching element 61 to the ON state in the normal state, in which the index voltage Q is lower than the reference voltage R. Conversely, the driving circuit 63 sets the switching element 61 to the OFF state in the abnormal state, in which the index voltage Q exceeds the reference voltage R. The duty ratio of the pulse signal Pa changes depending on the load of the power supply circuit 14 or the like and is usually not constant. However, the example of FIG. 3 shows a waveform in which the duty ratio is constant for convenience. In particular, the DC voltage Db1 decreases between a time t2 and a time t3 during which the supply of power is interrupted. The duty ratio correspondingly increases immediately after the time t3 at which the supply of the power is resumed.

As shown in FIG. 2, the control signal S generated by the driving circuit 63 is supplied to the control terminal of the switching element 61. In addition, the control signal S is supplied to the switching control circuit 48 via an optical coupler 53. Examples for the optical coupler 52 and the optical coupler 53 include a photocoupler (product number: TLP785) manufactured by Toshiba Corporation.

In the normal state, in which the control signal S is set to the high level, the PWM circuit 481 of the switching control circuit 48 generates the pulse signal Pa, with the duty ratio depending on the DC voltage Db1, as described above. When the control signal S transitions to a low level (the abnormal state), the PWM circuit 481 stops generating the pulse signal Pa. Therefore, the driving circuit 63 maintains the switching element 44 to be in the OFF state. As will be understood from the foregoing description, the switching control circuit 48 controls switching of the switching element 44 with the duty ratio depending on the DC voltage Db1 in the normal state. Conversely, the switching control circuit 48 maintains the switching element 44 in the OFF state in the abnormal state in which the index voltage Q exceeds the reference voltage R. In other words, the duty ratio of the pulse signal Pa is fixed to zero in the abnormal state.

In the embodiment, as shown in FIG. 3, both of the switching element 61 and the switching element 44 are maintained to be in the OFF state in the abnormal state. Accordingly, the supply of the current to the primary coil La of the transformer 43 is stopped, and the second electrode E2 of the capacitor 42 is in a state that is close to electrical floating. Therefore, the discharge of the capacitor 42, which has been charged immediately before the transition to the abnormal state, is suppressed.

Attention is drawn to a time constant $\tau 1$ regarding a rising of the index voltage Q generated by the voltage generator 621. The time constant $\tau 1$ is determined by the following: an internal resistance of the AC power supply 200, a capacitance of the capacitor 625 constituting the voltage generator 621, an ON resistance of the switching element 61, and a capacitance of the capacitor 42. In the embodiment, the time constant $\tau 1$ regarding the index voltage Q generated by the voltage generator 621 is smaller than a time constant $\tau 2$ regarding a rising of a voltage across both terminals of the capacitor 42 ($\tau 1 < \tau 2$). Where the time constant $\tau 2$ is determined by the ON resistance of the switching element 61 (a resistance in the ON state) and the capacitance of the capacitor 42. Therefore, for example, when an abnormal rise of the AC voltage A occurs at the time t1 in FIG. 3, the index voltage Q rises faster than the voltage across both the terminals of the capacitor 42 and reaches the reference voltage R. Specifically, the time constant $\tau 1$ and the time constant $\tau 2$ are designed so that the following two conditions are satisfied. One of the conditions is that the index voltage Q exceeds the reference voltage R at the time t2 slightly before the voltage across both the terminals of the capacitor 42 reaches the withstand voltage of the capacitor 42. The other condition is that the switching element 61 transitions to the OFF state before the voltage across both the terminals reaches the withstand voltage. As will be understood from the foregoing description, in the embodiment, since the time constant $\tau 1$ of the voltage generator 621 is designed to be smaller than the time constant $\tau 2$ of the switching element 61 and the capacitor 42 by a necessary amount of time, it is possible to reliably protect the capacitor 42 from an abnormality in the voltage A.

Then, when the index voltage Q is lower than the reference voltage R (that is, return from the abnormal state to the normal state occurs) as the AC voltage A decreases from the abnormal voltage, the control signal S generated by the driving circuit 63 transitions from a low level to a high level (time t3), as shown in FIG. 3. Although FIG. 3 shows, for the sake of convenience, that the time constant $\tau 3$ regarding decrease of the index voltage Q is equal to the time constant $\tau 1$, the time constant $\tau 3$ is sufficiently greater than the time constant $\tau 1$ in actuality. When the control signal S transitions to the high level, the switching element 61 transitions to the ON state. In addition, the switching control circuit 48 returns to a state in which the switching control circuit 48 controls the switching of the switching element 44 with the duty ratio depending on the DC voltage Db1. That is, the power supply circuit 14 returns to a normal operation state in which each DC voltage D is generated from the AC voltage A. As described above, in the embodiment, since the second electrode E2 of the capacitor 42 is set to a state that is close to electrical floating in the abnormal state, discharge of the capacitor 42 is suppressed. That is, when a period of time of the abnormal state is not too long, electric charges sufficient for operation of a power supply remain in the capacitor 42 even at a time at which transition from the abnormal state to the normal state has occurred. Therefore, it is possible to return to the normal operation state in which a desired DC voltage D is generated rapidly from the time at which transition to the normal state occurs, as compared with a case in which the capacitor 42 is completely discharged at the time at which transition to the normal state occurs. However, in the configuration shown in FIG. 2, it is desirable for a capacitance of the capacitor 472 or the capacitor 474 to be sufficiently large, such that electric charges necessary for an operation of the power supply remain in the capacitor 472 or the capacitor 474.

Modifications

The embodiments detailed above may be modified in various ways. Examples of specific modifications will now be described. Two or more modes selected freely among the following may also be combined.

(1) In the above-described aspect, although the switching element 61 is provided between the second electrode of the capacitor 42 and the rectifying circuit 41, the location of the switching element 61 is not limited to the above embodiment. For example, there may be used, as the switching element 61, a P-channel MOSFET disposed between the rectifying circuit 41 and the first electrode E1 of the capacitor 42. As will be understood from the foregoing description, the switching element 61 according to the preferred embodiment of the present invention is disposed on a path for charging of the capacitor 42.

In other words, this is a configuration in which charging of the capacitor 42 is stopped when the switching element 61 transitions to the OFF state.

(2) Although the above embodiment shows an example of a configuration in which the DC voltage Da (Da1 and Da2) for an analog circuit and the DC voltage Db (Db1 and Db2) for a digital circuit are generated, the present invention is also applicable to a configuration in which only one of the DC voltage Da and the DC voltage Db is generated. In a configuration in which only the DC voltage Da is generated, the voltage divider 51 is provided in a position in which the DC voltage Da is divided, such that the feedback voltage B is generated from the DC voltage Da.

(3) Although the above embodiment exemplifies the audio system 100 including the power supply circuit 14, the power supply circuit 14 may be realized as a circuit independent of the audio system 100. That is, an embodiment of the present disclosure may be conceived as a power supply circuit alone.

(4) For example, the following aspect is understood from the foregoing embodiments.

Aspect 1

A power supply circuit according to a preferred aspect (aspect 1) of the present invention is a power supply circuit configured to generate a DC voltage from an AC voltage, and the power supply circuit includes a rectifying circuit configured to rectify the AC voltage; a capacitor configured to smooth the rectified voltage; a first switching element disposed on a path for charging the capacitor; a comparison circuit configured to compare an index voltage depending on the smoothed voltage with a reference voltage; and a driving circuit configured to set the first switching element to an ON state in a state in which the index voltage is lower than the reference voltage and to set the first switching element to an OFF state, in a state in which the index voltage exceeds the reference voltage. In the above configuration, in a state in which the index voltage exceeds the reference voltage, the first switching element is set to the OFF state, whereby the application of an abnormal voltage to the capacitor is suppressed. Therefore, it is possible to protect the capacitor from the abnormality in the AC voltage. In a state in which the index voltage is equal to the reference voltage, the first switching element is controlled to be either in the ON state or the OFF state.

Aspect 2

The power supply circuit according to a preferred example (aspect 2) of aspect 1 includes a transformer including a primary coil and a secondary coil; a second switching element configured to be switched to an ON state in which the smoothed voltage is applied to the primary coil or to an OFF state in which the voltage is not applied to the primary coil; a voltage generation circuit configured to generate the DC voltage from a voltage of the secondary coil; and a switching control circuit configured to control switching of the second switching element with a duty ratio depending on the DC voltage in a state in which the index voltage is lower than the reference voltage, and to maintain the second switching element in the OFF state in a state in which the index voltage exceeds the reference voltage. In the above configuration, when the index voltage exceeds the reference voltage, both the first switching element and the second switching element are set to the OFF state, such that discharge of the capacitor is suppressed as compared with a configuration in which the second switching element continues switching. Therefore, it is possible to return to the normal operation state of a power supply in which to generate a given DC voltage, rapidly from the transition to the state in which the index voltage is lower than the reference voltage.

Aspect 3

The power supply circuit according to a preferred example (aspect 3) of the aspect 1 or 2 includes a voltage generator configured to generate the index voltage by dividing the smoothed voltage, and a time constant regarding the index voltage generated by the voltage generator is smaller than a time constant regarding a voltage across both terminals of the capacitor corresponding to an ON resistance of the switching element and a capacitance of the capacitor. In the above configuration, the time constant of the voltage generator is smaller than the time constant corresponding to the ON resistance of the switching element and the capacitance of the capacitor. Therefore, the index voltage depending on the smoothed voltage rises at a higher speed than a speed at which the voltage of the capacitor rises due to an abnormality in the AC voltage, and exceeds the reference voltage. Therefore, it is possible to reliably protect the capacitor from the abnormality in the AC voltage.

Aspect 4

An audio system according to a preferred aspect (aspect 4) of the present invention is an audio system including an audio processing device configured to process an audio signal, and a power supply circuit configured to generate a DC voltage from an AC voltage and to supply the DC voltage to the audio processing device, in which the power supply circuit includes a rectifying circuit configured to rectify the AC voltage; a capacitor configured to smooth the rectified voltage; a first switching element disposed on a path for charging the capacitor; a comparison circuit configured to compare an index voltage depending on the smoothed voltage with a reference voltage; and a driving circuit configured to set the first switching element to an ON state, in a state in which the index voltage is lower than the reference voltage, and to set the first switching element to an OFF state, in a state in which the index voltage exceeds the reference voltage.

DESCRIPTION OF REFERENCE SIGNS

100 Audio system
200 AC power supply
12 Signal supply device
14 Power supply circuit
16 Audio processing device
18 Sound outputter
20 Control unit
22 Control processor
24 Memory circuit
30 Signal processing circuit
32 A/D convertor
34 Signal processor
36 D/A convertor
38 Power amplifier
41 Rectifying circuit
42 Capacitor
43 Transformer
La Primary coil
Lb (Lb1, Lb2, Lb3, Lb4) Secondary coil
44 Switching element
45 Voltage generation circuit
46 Voltage generation circuit
47 Voltage generation circuit
48 Switching control circuit
481 PWM Circuits
482 Drive circuit
51 Voltage divider
52, 53 Optical coupler
61 Switching element
62 Detection circuit
621 Voltage generator
622 Voltage generator
623 Comparison circuit
63 Drive circuit

What is claimed is:

1. A power supply circuit for generating a direct current (DC) voltage from an alternating current (AC) voltage, the power supply circuit comprising:
   a rectifying circuit configured to rectify the AC voltage;
   a capacitor including a first electrode and a second electrode, and configured to smooth the rectified voltage;
   a first switching element disposed on a path for charging the capacitor;
   a comparison circuit configured to compare an index voltage that depends on the smoothed rectified voltage with a reference voltage;
   a driving circuit configured to set the first switching element to:
      an ON state, in a state where the index voltage is lower than the reference voltage; and
      an OFF state, in a state where the index voltage exceeds the reference voltage;

a transformer including a primary coil and a secondary coil, wherein the primary coil includes:
  a first terminal connected to the first electrode; and
  a second terminal;
a voltage generation circuit configured to generate the DC voltage from a voltage of the secondary coil;
a second switching element disposed in a path between the second electrode and the second terminal, and configured to be switched to:
  an ON state, in a state where the smoothed rectified voltage is applied to the primary coil; or
  an OFF state, in a state where the smoothed rectified voltage is not applied to the primary coil; and
a switching control circuit configured to:
  control switching of the second switching element with a duty ratio that depends on the DC voltage, in a state where the index voltage is lower than the reference voltage; and
  maintain the second switching element in the OFF state, in a state where the index voltage exceeds the reference voltage.

2. The power supply circuit according to claim 1, further comprising:
a voltage generator configured to generate the index voltage by dividing the smoothed rectified voltage,
wherein a time constant regarding the index voltage generated by the voltage generator is smaller than a time constant regarding a voltage across both terminals of the capacitor corresponding to an ON resistance of the switching element and a capacitance of the capacitor.

3. A power supply circuit for generating a direct current (DC) voltage from an alternating current (AC) voltage, the power supply circuit comprising:
a rectifying circuit configured to rectify the AC voltage;
a capacitor configured to smooth the rectified voltage;
a switching element disposed on a path for charging the capacitor;
a comparison circuit configured to compare an index voltage that depends on the smoothed rectified voltage with a reference voltage;
a driving circuit configured to set the switching element to:
  an ON state, in a state where the index voltage is lower than the reference voltage; and
  an OFF state, in a state where the index voltage exceeds the reference voltage;
a voltage generator configured to generate the index voltage by dividing the smoothed rectified voltage,
wherein a time constant regarding the index voltage generated by the voltage generator is smaller than a time constant regarding a voltage across both terminals of the capacitor corresponding to an ON resistance of the switching element and a capacitance of the capacitor.

4. An audio system comprising:
an audio processing device configured to process an audio signal; and
a power supply circuit configured to generate a direct current (DC) voltage from an alternating current (AC) voltage and to supply the DC voltage to the audio processing device,
wherein the power supply circuit includes:
  a rectifying circuit configured to rectify the AC voltage;
  a capacitor configured to smooth the rectified voltage;
  a first switching element disposed on a path for charging the capacitor;
  a comparison circuit configured to compare an index voltage depending on the smoothed rectified voltage with a reference voltage;
  a driving circuit configured to set the first switching element to:
    an ON state, in a state where the index voltage is lower than the reference voltage; and
    an OFF state, in a state where the index voltage exceeds the reference voltage;
  a transformer including a primary coil and a secondary coil, wherein the primary coil includes:
    a first terminal connected to the first electrode; and
    a second terminal;
  a voltage generation circuit configured to generate the DC voltage from a voltage of the secondary coil;
  a second switching element disposed in a path between the second electrode and the second terminal, and configured to be switched to:
    an ON state, in a state where the smoothed rectified voltage is applied to the primary coil; or
    an OFF state, in a state where the smoothed rectified voltage is not applied to the primary coil; and
  a switching control circuit configured to:
    control switching of the second switching element with a duty ratio that depends on the DC voltage, in a state where the index voltage is lower than the reference voltage; and
    maintain the second switching element in the OFF state, in a state where the index voltage exceeds the reference voltage.

5. The audio system according to claim 4, wherein the power supply circuit further includes:
a voltage generator configured to generate the index voltage by dividing the smoothed rectified voltage,
wherein a time constant regarding the index voltage generated by the voltage generator is smaller than a time constant regarding a voltage across both terminals of the capacitor corresponding to an ON resistance of the switching element and a capacitance of the capacitor.

* * * * *